US006628684B2

(12) United States Patent
Kobayashi et al.

(10) Patent No.: US 6,628,684 B2
(45) Date of Patent: Sep. 30, 2003

(54) TIMING SYNCHRONIZATION DEVICE OF A PULSED LASER AND AN OPTICAL SYNTHESIZER

(75) Inventors: Yohei Kobayashi, Tsukuba (JP); Kenji Torizuka, Tsukuba (JP); Wei Zhiyi, Tsukuba (JP)

(73) Assignee: National Institute of Advanced Industrial Science and Technology, Tokyo (JP)

( * ) Notice: Subject to any disclaimer, the term of this patent is extended or adjusted under 35 U.S.C. 154(b) by 0 days.

(21) Appl. No.: 10/102,883

(22) Filed: Mar. 22, 2002

(65) Prior Publication Data

US 2003/0012233 A1 Jan. 16, 2003

(30) Foreign Application Priority Data

Jul. 12, 2001 (JP) ........................................ 2001-211634

(51) Int. Cl.[7] ................................................. H01S 3/00
(52) U.S. Cl. ..................... 372/38.1; 372/38.06; 372/25; 372/92
(58) Field of Search ........................ 372/38.1, 3, 38.06, 372/25, 92; 219/121.7

(56) References Cited

U.S. PATENT DOCUMENTS

| 5,185,736 A | * | 2/1993 | Tyrrell et al. ................. 370/358 |
| 5,448,417 A | * | 9/1995 | Adams .......................... 359/856 |
| 5,721,748 A | * | 2/1998 | Injeyan et al. .................. 372/3 |
| 5,796,761 A | * | 8/1998 | Injeyan et al. .................. 372/3 |
| 5,815,519 A | * | 9/1998 | Aoshima et al. ............... 372/25 |
| 2003/0047541 A1 | * | 3/2003 | Sun et al. ................. 219/121.7 |

OTHER PUBLICATIONS

"Dual–wavelength self–m odelocked Ti:sapphire laser"; Evans et al; Optics Letters vol. 18, No. 13, Jul. 1, 1993.*
"Two–color synchronously modelocked femtosecond Ti:sapphire laser"; Barros et al; Optics Letters vol. 18, No. 8, Apr. 15, 1993.*
Evans, J. M. et al., "Dual–Wavelength Self–Mode–Locked Ti:sapphire Laser", Optics Letters, vol. 18, No. 13, Jul. 1993, pp. 1074–1076.
Dykaar, D. R. and Darack, S. B., "Sticky pulses: two–color cross–mode–locked femtosecond operation of a single Ti:sapphire laser", *Optical Letters*, Optical Society of America. Vol. 18, No. 8, Apr. 1993, pp. 634–636.
de Barros, M. R. X. and Becker, P. C., Two–color synchronously mode–locked femtosecond Ti:sapphire laser, *Optics Letters*, Optical Society of America. Vol. 18, No. 8, Apr. 1993, pp.631–633.
Products: "Ultra–Short Pulse Laser System", Spectrum–Physics, The Solid State Laser Company, 2000–2001, cover & p. 18.

(List continued on next page.)

*Primary Examiner*—Leon Scott, Jr.
(74) *Attorney, Agent, or Firm*—Sterne, Kessler, Goldstein & Fox P.L.L.C.

(57) ABSTRACT

A timing synchronization device of a pulsed laser is composed of a first laser gain medium having a first gain region, a second laser gain medium having a second gain region that is not included in the first gain region, and first and second resonators provided with the first and second laser gain media, respectively, and arranged so that two laser pulses occurring in the first and second resonators, respectively, overlap with each other in one of the first and second laser gain media. The second laser gain medium has an oscillation wavelength at which the first laser gain medium crystal cannot cause oscillation.

20 Claims, 9 Drawing Sheets

OTHER PUBLICATIONS

Steinmeyer, G., "Ultrafast Timing Stabilization", *Swiss Federal Institute of Technology*, Switzerland, Presider, 1995, CTuG1 and CTuG2, one sheet.

White, S.J. et al., "Dual–wavelength self–mode–locked Ti:sapphire laser", *J.F. Allen Physics Research Laboratories*, Department of Physics and Astronomy, University of St. Andrews, Jan. 15, 1993, CThB5, two sheets.

Leitenstorfer, A. et al., "Widely tunable two–color mode–locked Ti:saphhire laser with pulse jitter of less than 2fs", *Optics Letters*, Optical Society of America vol. 20, No. 8, Apr. 1995, pp. 916–918.

* cited by examiner

TIMING SYNCHRONIZATION DEVICE OF A PULSED LASER AND AN OPTICAL SYNTHESIZER

This application is based on Japanese Patent Application No. 2001-211634 filed Jul. 12, 2001, the content of which is incorporated hereinto by reference.

BACKGROUND OF THE INVENTION

1. Field of the Invention

The present invention relates to a timing synchronization device of a pulsed laser and an optical synthesizer. More specifically, the invention relates to a timing synchronization device of a femtosecond pulsed laser that is widely used as an ultrashort pulse light source in optical communications, medical care, and other science and technology fields as well as to an optical synthesizer using it.

2. Description of the Related Art

The following two methods are typical of the conventional sync control techniques of femtosecond pulsed lasers.

In the first method, sync control is performed by detecting pulse intervals of independent ultrashort pulse laser beams having different wavelengths with electric circuits such as counters, determining their deviation value, and feeding back the deviation value to a resonator-mirror-driving piezoelectric transducer that is provided in one of the pulsed lasers.

In this method, the timing jitter is determined by the resolutions of the electric circuits and the piezoelectric transducer, and is of the order of picoseconds on the product level (reference 1: General catalogue '00-'01 of Spectra-physics Corp., p. 18, "lok-to-clock") and of the order of 10–20 femtoseconds on the research level (reference 2: R. K. Shelton et al., international conference CLEO 2001, CTuG2).

In the second method, two resonators are produced for one laser gain medium. It has been reported that two timing-synchronized pulse laser beams having difference wavelengths can be output from a Ti:sapphire laser having Ti:sapphire as a laser gain medium (reference 3: S. J. White et al., international conference CLEO 2000, CThB5; reference 4: J. M. Evans et al., Opt. Lett., 18, p. 1,074, 1993; reference 5: A. Leitenstorfer et al., Opt. Lett., 20, p. 916, 1995; reference 6: M. R. X. de Barros et al., Opt. Lett., 18, p. 631, 1993; and reference 7: D. R. Dykaar et al., Opt. Lett., 18, p. 634, 1993).

It is considered that in this method two pulse laser beams cause four-wave mixing in one laser gain medium to establish timing synchronization.

However, the first method has a problem that the influence of timing jitter is too large to perform correct sync control on a femtosecond pulsed laser.

The second method has a problem that the wavelengths of pulse laser beams produced by a two-wavelength timing-synchronized laser having Ti:sapphire as a laser gain medium are restricted to only two close wavelengths that are determined by the characteristics of the laser gain medium because only one laser gain medium is used. There is another problem that the two pulse laser beams are produced by using Ti:sapphire as the laser gain medium and hence are rendered unstable in a state of good pulse overlap because of occurrence of gain competition. Because of this phenomenon, in two-wavelength timing-synchronized lasers having Ti:sapphire as a laser gain medium, it is difficult to synchronize two pulse laser beams having different wavelengths with each other in a stable manner.

SUMMARY OF THE INVENTION

The present invention has been made in view of the above problems in the art, and an object of the invention is therefore to provide a timing synchronization device of a pulsed laser capable of timing-synchronizing two ultrashort pulse laser beams whose wavelengths are separated from each other to some extent as well as an optical synthesizer using it.

The invention employs the following configurations to attain the above object.

The invention provides a first timing synchronization device of a pulsed laser, comprising a first laser gain medium having a first gain region; a second laser gain medium having a second gain region that is not included in the first gain region; and first and second resonators provided with the first and second laser gain media, respectively, and arranged so that two laser pulses occurring in the first and second resonators, respectively, overlap with each other in one of the first and second laser gain media, wherein the second laser gain medium has an oscillation wavelength at which a crystal of the first laser gain medium cannot cause oscillation.

A second timing synchronization device according to the invention is such that, in the first timing synchronization device, group velocity dispersion of each of the first and second resonators as a whole is set minus, and a leading laser pulse changes a refractive index characteristic of the one laser gain medium to a red-shift-inducing characteristic or a blue-shift-inducing characteristic and a lagging laser pulse is caused to pass through the one laser gain medium, whereby the leading laser pulse and the lagging laser pulse are synchronized with each other.

A third timing synchronization device according to the invention is such that, in the first timing synchronization device, a first pulse laser beam produced by using the first laser gain medium and a second pulse laser beam produced by using the second laser gain medium are synchronized with each other in such a manner that an frequency spacing among adjacent longitudinal modes of the first pulse laser beam and that of the second pulse laser beam are made identical through four-wave mixing.

A fourth timing synchronization device according to the invention is such that, in the first timing synchronization device, the first gain medium is Ti:sapphire and the second gain medium is Cr:forsterite.

A fifth timing synchronization device according to the invention is such that, in the first timing synchronization device, the first laser gain medium is Ti:sapphire and the second laser gain medium is $Cr^{4+}$-doped YAG.

The invention provides a first optical synthesizer comprising any of the first to fifth timing synchronization devices; and a nonlinear crystal, wherein first and second pulse laser beams having different first and second optical frequencies $\omega 1$ and $\omega 2$, respectively, that are output from the timing synchronization device are input to the nonlinear crystal, and wherein the optical synthesizer outputs, through the nonlinear crystal, a sum-frequency beam having a sum frequency $\omega 3$ ($=\omega 1+\omega 2$) of the first and second frequencies and a differential frequency beam having a differential frequency $\omega 4(=\omega 1-\omega 2)$ of the first and second frequencies, outputs, through the nonlinear crystal, a second-harmonic pulse of the first beam having a frequency $2 \cdot \omega 1$ that is two times higher than the optical first frequency, and outputs, through the nonlinear crystal, a second harmonic pulse of the second beam having a frequency $2 \cdot \omega 2$ that is two times higher than the second optical frequency, and outputs the first and second pulse laser beams as they are.

A second optical synthesizer according to the invention is such that, in the first optical synthesizer, the first and second frequencies correspond to wavelengths of 850 nm and 1,275 nm, respectively, and the sum frequency corresponds to a wavelength of 510 nm.

A third optical synthesizer according to the invention is such that, in the first optical synthesizer, the optical synthesizer combines arbitrarily selected ones of the first and second pulse laser beams, the sum-frequency beam, the differential frequency beam, and the first and second second harmonic beams, and outputs a resulting beam.

In the invention, the second laser gain medium has an oscillation wavelength at which the first laser gain medium crystal cannot cause oscillation, whereby pulse laser beams having much different oscillation wavelengths can be synchronized with each other.

In the timing synchronization device of a two-wavelength pulsed laser according to the invention, two pulse beams having different wavelengths are generated by using two laser gain media and synchronized with each other in a passive manner. As a result, two pulse beams having different wavelengths having a very low degree of timing jitter.

Since the laser gain medium for timing synchronization is made of a material that is transparent to one pulse beam, no gain competition occurs and more stable timing synchronization can be attained.

Further, the optical synthesizer according to the invention can produce an optical field having an arbitrary waveform and can easily generate RGB signals for color image display.

The above and other objects, effects, features and advantages of the present invention will become more apparent from the following description of embodiments thereof taken in conjunction with the accompanying drawings.

DETAILED DESCRIPTION OF PREFERRED EMBODIMENTS

Embodiments of the present invention will be hereinafter described with reference to the accompanying drawings.

Figure 1:
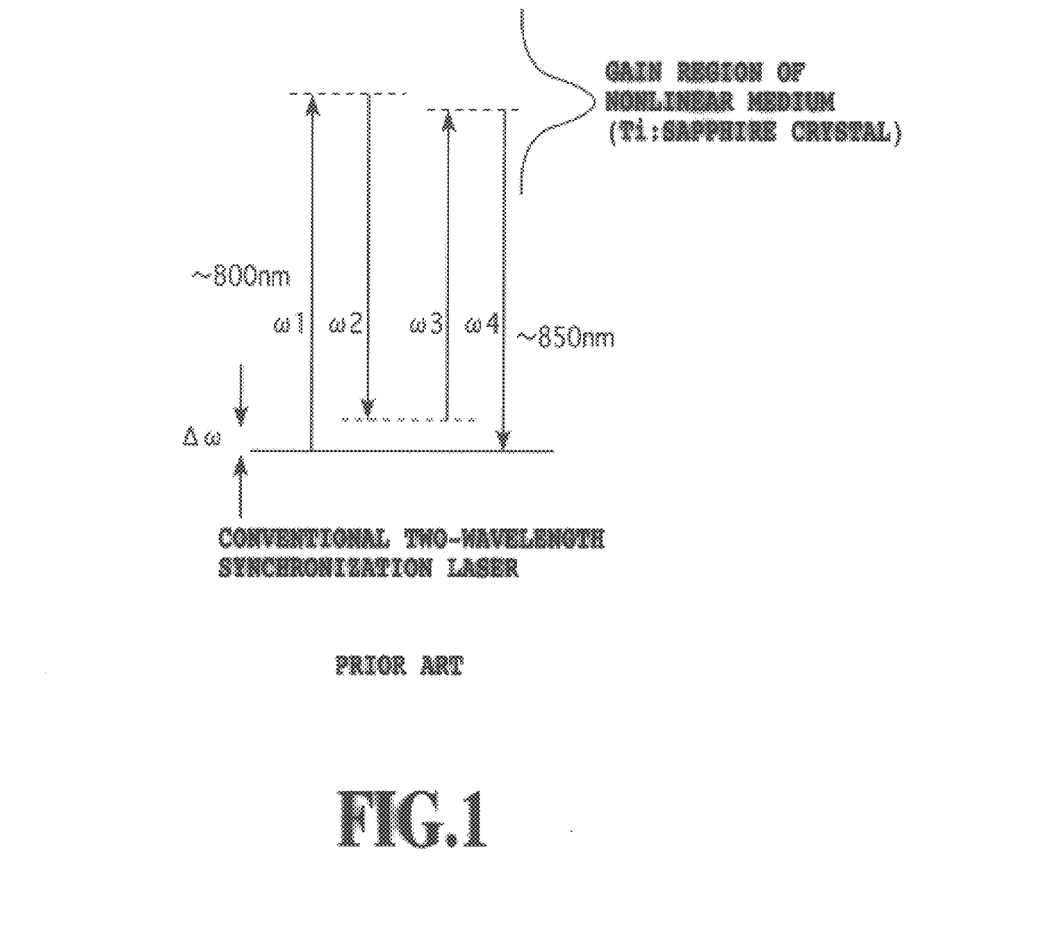
FIG. 1 illustrates a characteristic of a conventional two-wavelength-synchronized laser in which the vertical axis represents the energy value of light and the horizontal axis represents transition processes of respective light frequency components.

FIG. 1 illustrates a characteristic of a conventional two-wavelength-synchronized laser to be compared with a timing synchronization device of a pulsed laser according to the invention. In FIG. 1, the vertical axis represents the energy value of light and the horizontal axis represents transition processes of respective light frequency components.

Symbols $\omega 1$ and $\omega 2$ on the horizontal axis mean light frequency components in Ti:sapphire crystal that are distant from each other by the repetition frequency of master laser light having a certain wavelength (in this example, 800 nm). Symbols $\omega 3$ and $\omega 4$ mean light frequency components in Ti:sapphire crystal that are distant from each other by the repetition frequency of laser light having another wavelength (in this example, 850 nm).

The energy values of the pulse beams having the wavelengths 800 nm and 850 nm are located in the gain region of the Ti:sapphine crystal because the laser gain medium is the Ti:sapphine crystal which is a nonlinear medium. Both of the energy difference between $\omega 1$ and $\omega 2$ and the energy difference between $\omega 3$ and $\omega 4$ are equal to $\Delta \omega (=\omega 1 - \omega 2 = \omega 4 - \omega 3)$.

As described above, in the conventional two-wavelength-synchronized laser, the wavelengths of the two pulse laser beams need to be set so that their energy values located in the gain region of the nonlinear medium (Ti:sapphire crystal). As such, the conventional two-wavelength-synchronized laser is bound by the characteristics of one laser gain medium crystal.

In contrast, use of the timing synchronization device of a pulsed laser according to the invention makes it possible to synchronize two pulse laser beams having distant wavelengths without being bound by the characteristics of one laser gain medium crystal.

Figure 2:
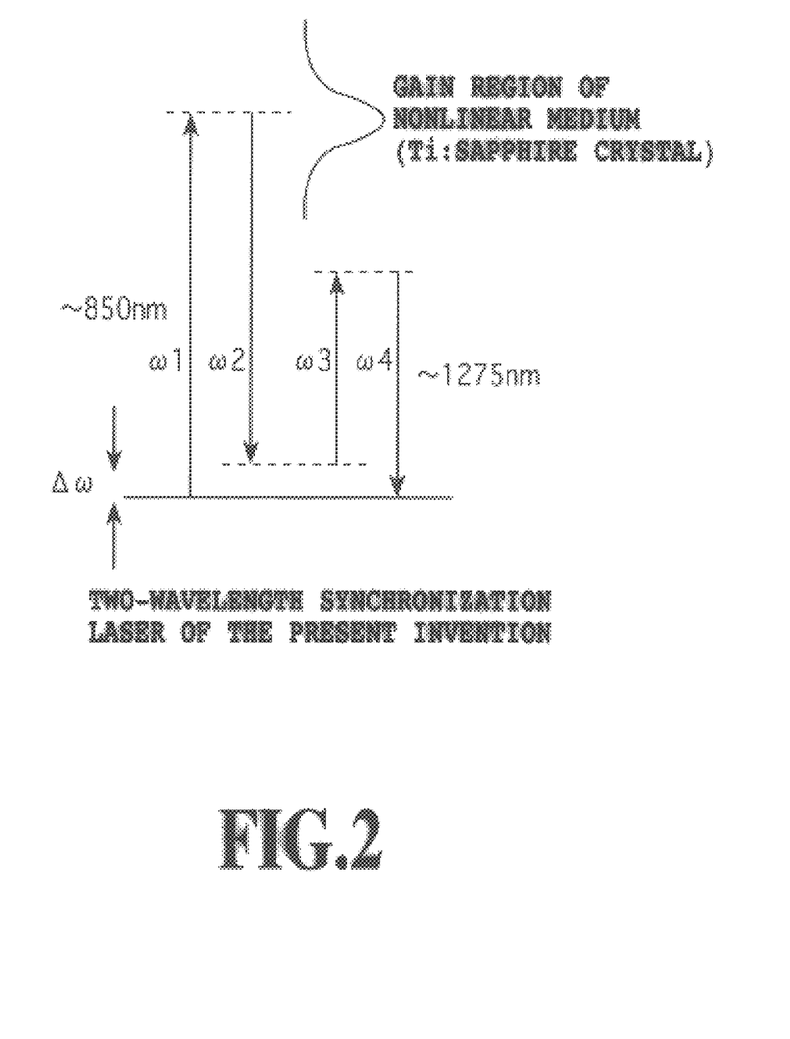
FIG. 2 illustrates a characteristic of a two-wavelength-synchronized laser using a timing synchronization device of a pulsed laser according to the present invention in which the vertical axis represents the energy value of light and the horizontal axis represents transition processes of respective light frequency components.

FIG. 2 illustrates a characteristic of a two-wavelength-synchronized laser using the timing synchronization device of a pulsed laser according to the invention. In FIG. 2, the vertical axis represents the energy value of light and the horizontal axis represents transition processes of respective light frequency components.

Symbols $\omega 1$ and $\omega 2$ on the horizontal axis mean light frequency components in Ti:sapphire crystal that are distant from each other by the repetition frequency of laser light having a certain wavelength (in this example, 850 nm). Symbols $\omega 3$ and $\omega 4$ mean light frequency components in Ti:sapphire crystal that are distant from each other by the repetition frequency of laser light having another wavelength (in this example, 1,275 nm).

As shown in FIG. 2, the energy value of the pulse light having the wavelength 850 nm is located in the gain region of the nonlinear medium (Ti:sapphire crystal) because the laser gain medium is the Ti:sapphire crystal. However, the energy value of the pulse light having the wavelength 1,275 nm is not located in the gain region of the nonlinear medium (Ti:sapphire crystal).

Therefore, the energy values of slave-laser-light-side frequency components $\omega 3$ and $\omega 4$ can be set outside the gain region of the nonlinear medium (Ti:sapphire crystal) where the energy values of the master-laser-light-side frequency components $\omega 1$ and $\omega 2$ are located; selection can be made as to the wavelength of laser light including the frequency components $\omega 3$ and $\omega 4$. That is, a medium that is different from the nonlinear medium (Ti:sapphire crystal) can be used as a laser gain medium. It is noted that both of the energy difference between $\omega 1$ and $\omega 2$ and the energy difference between $\omega 3$ and $\omega 4$ are equal to $\Delta \omega (=\omega 1-\omega 2=\omega 4-\omega 3)$.

As described above, the invention dissolves the disadvantage of the conventional two-wavelength-synchronized laser that the wavelengths of the two pulse beams need to be set so that their energy values are located in the gain region of the nonlinear medium (Ti:sapphire), and makes it possible to set wavelengths of two pulse laser beams without being bound by the characteristics of one laser gain medium crystal.

Therefore, in contrast to the fact that the conventional two-wavelength-synchronized laser utilizes four-wave mixing resulting from actual level transitions, in the two-wavelength-synchronized laser using the timing synchronization device of a pulsed laser according to the invention non-resonant transitions can be used for a slave-laser-light-side wavelength and hence no gain competition occurs.

Embodiment 1

Figure 3:
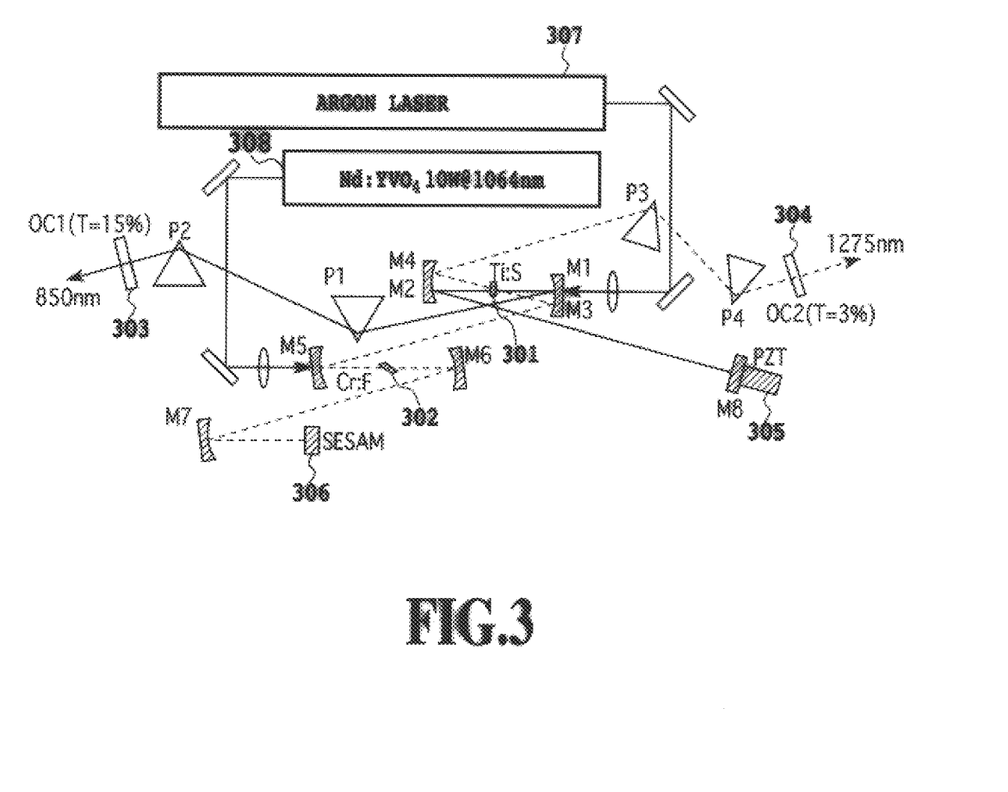
FIG. 3 shows the configuration of a timing synchronization device of a pulsed laser according to the invention that is composed of two laser gain media, two lasers as light sources for pumping the respective laser gain media, and a plurality of prisms and mirrors.

FIG. 3 shows the configuration of a timing synchronization device of a pulsed laser according to the invention. This device is composed of two laser gain media, two lasers as light sources for pumping the respective laser gain media, and a plurality of prisms and mirrors.

A Ti:sapphire crystal (Ti:S) 301 as the first laser gain medium is pumped by green laser light that is emitted from an argon laser 307 (or a second harmonic of a Nd-doped laser). Mirrors (M1, M2, and M8), a first output coupler 303, and prisms (P1 and P2) form a first resonator. Pulses having a center wavelength 850 nm and a pulse width 20 fs are generated by the first resonator at a repetition frequency of about 75 MHz. The mirror M8 is fixed to a piezoelectric transducer 305, whereby the resonator length can be adjusted by an external voltage.

A Cr:forsterite crystal (Cr:F) 302 as the second laser gain medium is pumped by a $Nd:YVO_4$ laser 308 having a wavelength 1,064 nm. Mirrors (M3–M7), a second output coupler 304, prisms (P3 and P4), and a semiconductor saturable absorber mirror 306 form a second resonator. Pulses having a center wavelength 1,275 nm and a pulse width 40 fs are generated by the second resonator.

Oscillation light of the laser (Cr:forsterite laser) having the Cr:forsterite crystal 302 as a laser gain medium passes through the Ti:sapphire crystal 301 in its own resonator, and coexists and interacts with and oscillation light of the laser having Ti:sapphire crystal 301 as a laser gain medium.

Four-wave mixing involving the optical frequency of the Ti:sapphire laser light and the optical frequency of the Cr:forsterite laser light occurs in the Ti:sapphire crystal 301, whereby the two pulse beams are timing-synchronized.

As shown in FIG. 2, the invention is different from the conventional two-wavelength Ti:sapphire laser in that the energy value of laser light of the Cr:forsterite laser is not located in the gain region of the Ti:sapphire crystal 301 and hence the Ti:sapphire crystal 301 is not a laser gain medium for the Cr:forsterite laser.

That is, four-wave mixing involving the frequency of Ti:sapphire laser light and the frequency of the Cr:forsterite laser light occurs in the Ti:sapphire crystal 301 which is a transparent material for the Cr:forsterite laser light, whereby timing synchronization occurs in a passive manner. This method makes it possible to synchronize pulse laser beams having much different wavelengths and to prevent gain competition between them.

(Mechanisms of Timing Synchronization)

The mechanisms of timing synchronization in the frequency domain and the time domain will be described below.

It is assumed that the Ti:sapphire laser and the Cr:forsterite laser are a master laser and a slave laser, respectively. The master laser itself is caused to generate ultrashort pulses with Kerr lens mode locking, and four-wave mixing occurs when Cr:forsterite laser light enters the Ti:sapphire crystal 301.

Figure 4:
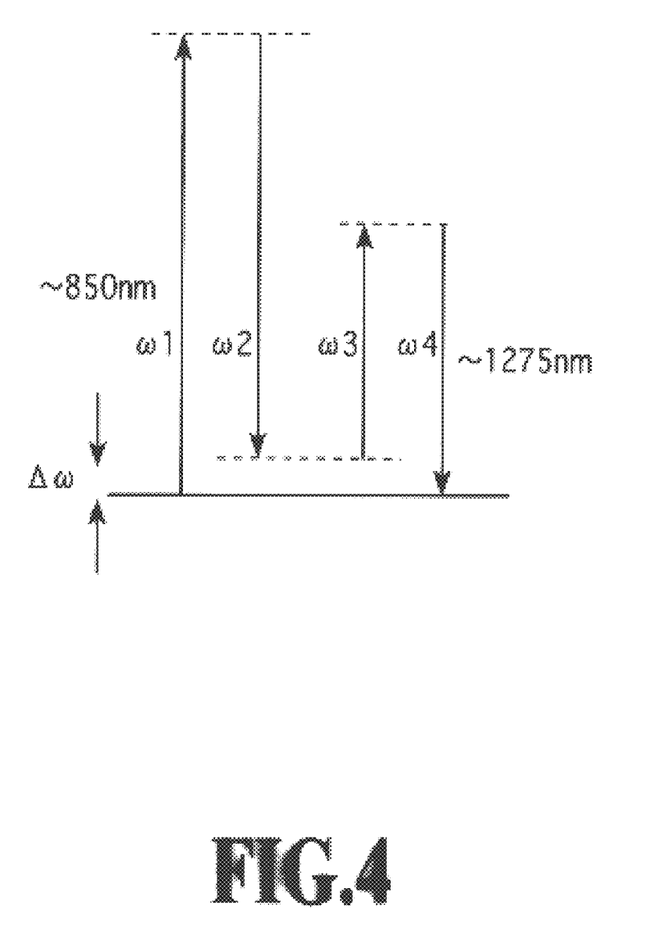
FIG. 4 illustrates how four-wave mixing occurs, that is, how a new light frequency $\omega 4$ is generated by four-wave mixing involving frequency components $\omega 1$ and $\omega 2$ of master laser light and a frequency component $\omega 3$ of slave laser light.

FIG. 4 illustrates how the four-wave mixing occurs. A new light frequency $\omega 4$ is generated by four-wave mixing involving frequency components $\omega 1$ and $\omega 2$ of the master laser light and a frequency component $\omega 3$ of the slave laser light. A relationship $\Delta \omega = \omega 1 - \omega 2 = \omega 4 - \omega 3$ holds, where ($\omega 1 - \omega 2$) and ($\omega 4 - \omega 3$) correspond repetition frequencies of the master laser and the slave laser, respectively.

Therefore, the repetition frequency of the slave laser is pulled into that of the master laser. The generation of $\omega 4$ by the four-wave mixing is considered due to energy transition from the master laser light to the slave laser light. That is, the gain of the slave laser light increases when the repetition frequency of the slave laser light coincides with that of the master laser light in the Ti:sapphire crystal which is a transparent material for the slave laser light.

(Light Wave Mixing)

The optical frequencies $\omega 1$ and $\omega 2$ are equal to particular longitudinal mode frequencies of the Ti:sapphire laser and the frequencies $\omega 3$ and $\omega 4$ are equal to particular longitudinal mode frequencies of the Cr:forsterite laser. Actually, each of the Ti:sapphire laser and the Cr:forsterite laser includes a lot of longitudinal modes. The interval ($\omega 1 - \omega 2$) between the particular longitudinal mode frequencies of the Ti:sapphire laser is equal to $\Delta \omega$, and the longitudinal mode frequency $\omega 4$ is generated so as to be distant from the longitudinal mode frequency $\omega 3$ by $\Delta \omega$. As a result, the interval ($\omega 4 - \omega 3$) between the particular longitudinal mode frequencies of the Cr:forsterite laser becomes equal to that of the Ti:sapphire laser. That is, synchronization is established at the repetition frequency $f = 2\pi \Delta \omega$.

(Time Domain)

Figure 5:
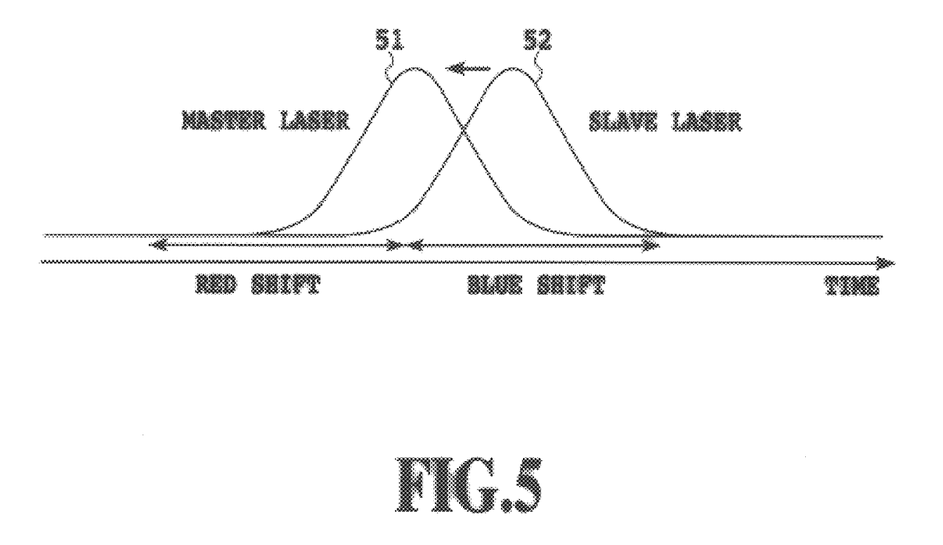
FIG. 5 illustrates a timing synchronization operation in the time domain in the timing synchronization device of a pulsed laser according to the invention.

FIG. 5 illustrates a timing synchronization operation in the time domain in the timing synchronization device of a pulsed laser according to the invention. It is assumed that a pulse 51 of the master laser leads a pulse 52 of the slave laser. The strong pulse 51 of the master laser causes a refractive index variation in the Ti:sapphire crystal 301. The refractive index of the crystal 301 becomes larger as the intensity of the pulse increases.

The temporal variation in refractive index causes a spectrum red shift at the rise of the pulse 51 of the master laser and a spectrum blue shift at its fall. Being located at the fall of the pulse 51 of the master laser, the pulse 52 of the slave laser is given a spectrum blue shift.

Since the group velocity dispersion of each entire laser resonator is set minus, the pulse 52 of the slave laser that is given the blue shift takes shorter time to make a round of the resonator and hence the blue shift serves in such a direction that the pulse 52 catches up the pulse 51 of the master laser. On the other hand, where the pulse 51 of the master laser lags the pulse 52 of the slave laser, a phenomenon opposite to the above occurs. That is, the pulse 52 of the slave laser takes longer time to make a round of the resonator and hence the two pulses 51 and 52 come closer to each other. In this manner, the two pulses 51 and 52 are synchronized with each other.

(Timing Synchronization in Time Domain)

It is assumed that both of a pulse 51 of the master laser and a pulse 52 of the slave laser are traveling leftward in the Ti:sapphire crystal 301 and the former is leading the latter.

The pulse 52 of the slave laser coexists with a fall portion of the pulse 51 of the master laser, and hence is given a spectrum blue shift. With its entire spectrum given the blue shift, the pulse 52 of the slave laser takes shorter time to make a round of the resonator. As a result, when the pulses 51 and 52 overlap spatially with each other next time, they coexist with each other for a longer time. If the pulse 52 of the slave laser passes the pulse 51 of the master laser, the pulse 52 comes to be given a red shift and to take longer time to make a round of the resonator. In this manner, the pulses 51 and 52 continue to coexist with each other.

In a state that the two resonator lengths are much different from each other, the lasers operate at repetition frequencies that are determined by the resonator lengths, respectively. When the difference between the resonator lengths falls within a pull-in range by changing the resonator length of the master laser using the piezoelectric transducer 305, the repetition frequency of the slave laser is pulled into that of the master laser and the two repetition frequencies coincide with each other completely.

Figure 6:
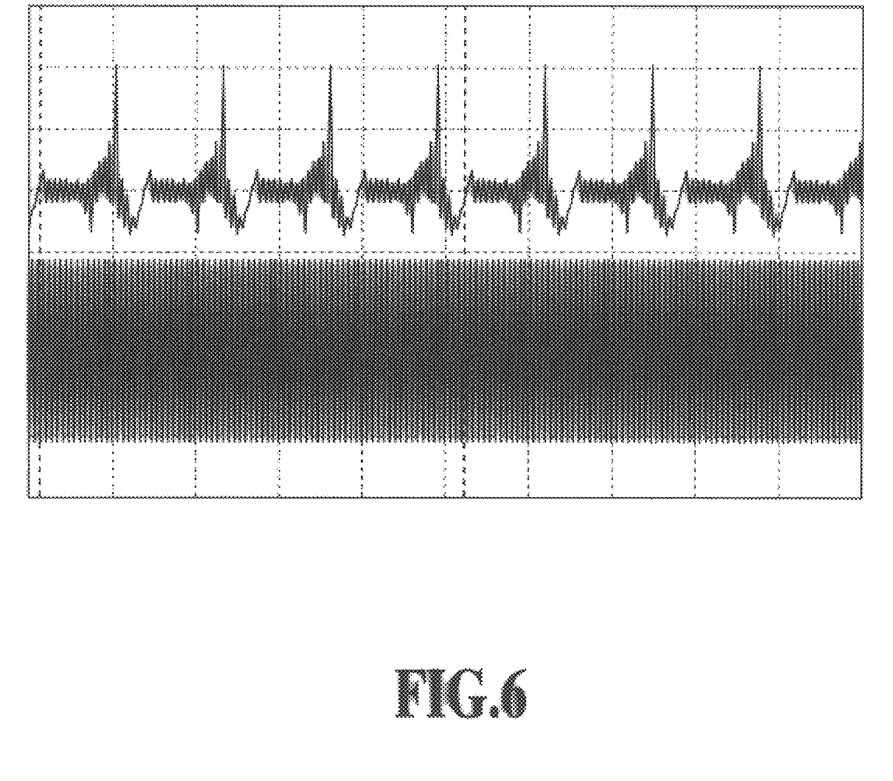
FIG. 6 is an oscilloscope photograph of a master laser pulse train and a slave laser pulse train that were photographed simultaneously in a state that the resonator lengths of the master laser and the slave laser had a large difference.
Figure 7:
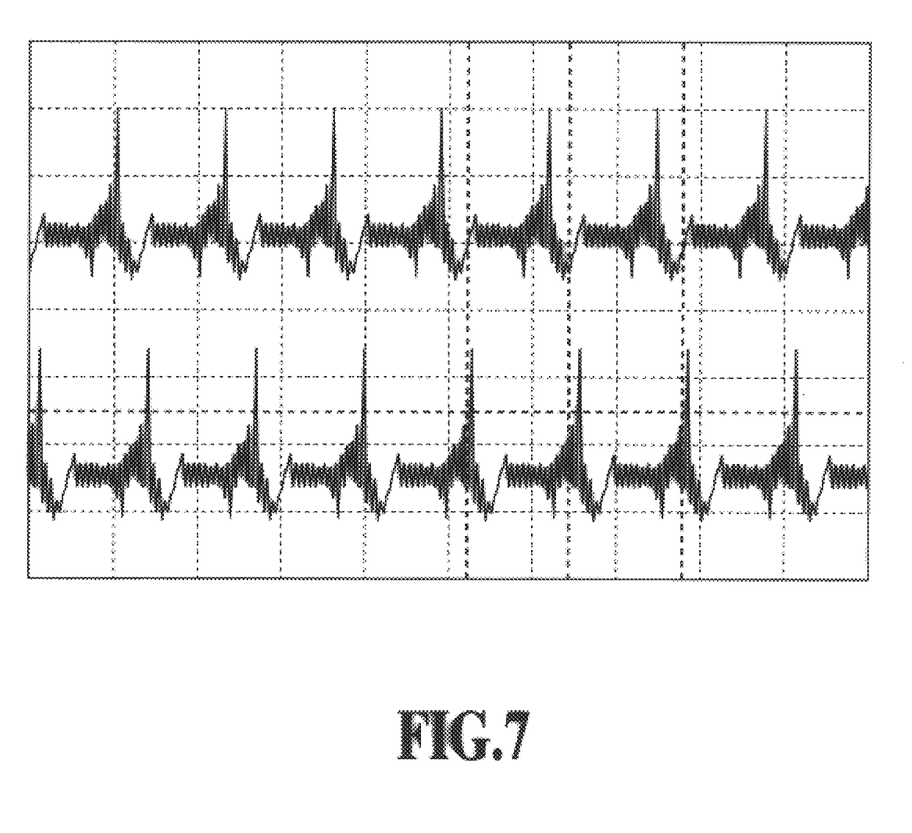
FIG. 7 is an oscilloscope photograph of a master laser pulse train and a slave laser pulse train that were photographed simultaneously in a state that synchronization was established by adjusting the resonator length of the master laser using a piezoelectric transducer.

Each of FIGS. 6 and 7 is an oscilloscope photograph of a master laser pulse train and a slave laser pulse train that were photographed simultaneously.

FIG. 6 shows waveforms that were taken in a state that the laser resonator lengths had a large difference. The top waveform is of the master laser pulse train and the bottom waveform is of the slave laser pulse train. It is seen that the slave laser pulse train was not synchronized with the master laser pulse train; that is, the slave laser pulse train was not taken as a stationary waveform because triggering was made by using the master laser pulse train.

FIG. 7 is an oscilloscope photograph of a master laser pulse train and a slave laser pulse train that were photographed simultaneously in a state that synchronization was established by adjusting the resonator length of the master laser using the piezoelectric transducer 305. It is seen that the two pulse trains are synchronized with each other by the resonator length adjustment.

Figure 8:
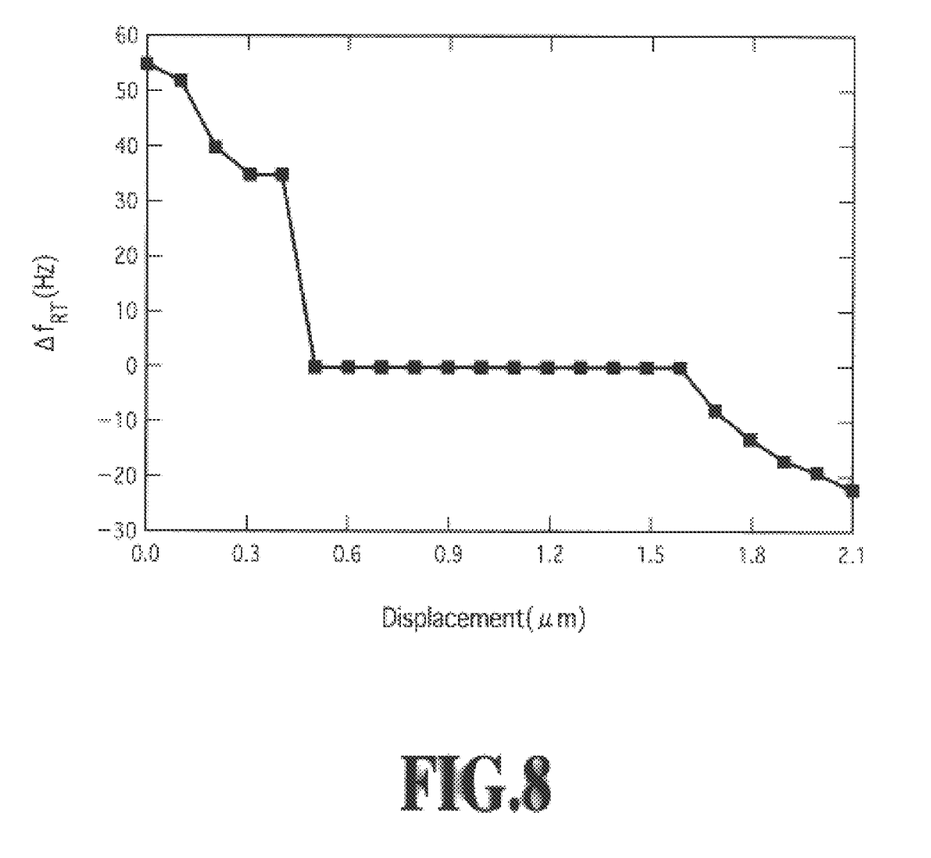
FIG. 8 is a graph showing a synchronization characteristic, that is, a relationship between the variation in resonator length and the difference between the repetition frequencies of the master laser and the slave laser, of the timing synchronization apparatus of a pulsed laser according to the invention in which the horizontal axis represents the variation ($\mu$m) of the resonator length of the master laser and the vertical axis represents the difference $\Delta f_{RT}$ (Hz) between the repetition frequencies.

FIG. 8 is a graph showing a synchronization characteristic, that is, a relationship between the variation in resonator length and the difference between the repetition frequencies. In FIG. 8, the horizontal axis represents the variation ($\mu$m) of the resonator length of the master laser and the vertical axis represents the difference $\Delta f_{RT}$ (Hz) between the repetition frequencies of the master laser and the slave laser. It is seen from FIG. 8 that the difference between the repetition frequencies is zero in a variation range of about 1 $\mu$m. It is understood that when the resonator length of the master laser is varied, the repetition frequency of the slave laser is pulled into that of the master laser and synchronization is established.

Embodiment 2

Next, a second embodiment of the invention will be described.

Figure 9:
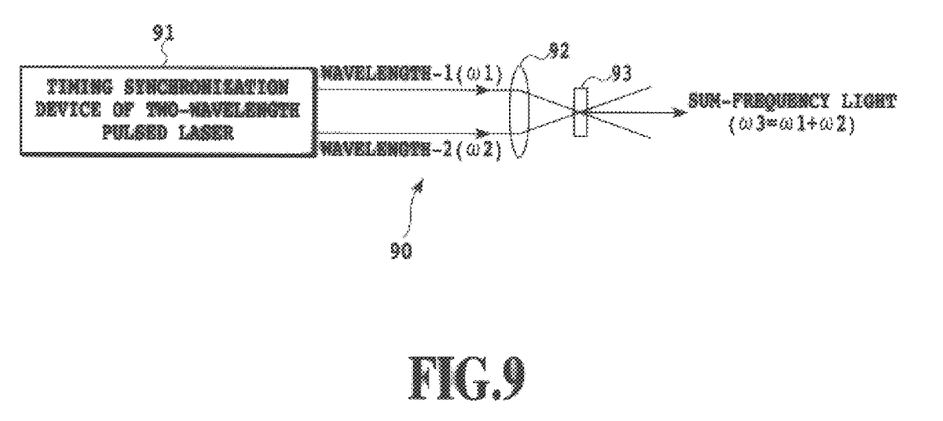
FIG. 9 is a schematic diagram of a sum-frequency generation device according to a second embodiment of the invention that uses the timing synchronization device of a two-wavelength pulsed laser according to the first embodiment and in which the timing synchronization device is caused to generate two pulse beams having a first frequency $\omega 1$ and $\omega 2$, which pass through a lens and a nonlinear crystal, whereby sum-frequency light having a frequency $\omega 3 = \omega 1 + \omega 2$ and second harmonics having respective frequencies of $2 \cdot \omega 1$ and $2 \cdot \omega 2$ are output.

FIG. 9 is a schematic diagram of a sum-frequency generation device 90 according to the second embodiment. The sum-frequency generation device 90 uses the timing synchronization device 91 of a two-wavelength pulsed laser according to the first embodiment. The timing synchronization device 91 is caused to generate two pulse beams having a first wavelength (frequency: $\omega 1$) and a second wavelength (frequency: ($\omega 2$), which pass through a lens 92 and a nonlinear crystal 93, whereby sum-frequency light having a frequency $\omega 3 = \omega 1 + \omega 2$ is output. Although in this embodiment the Ti:sapphire laser and the Cr:forsterite laser are used as the master laser and the slave laser, respectively, any combination of lasers may be employed as long as the laser gain medium of the master laser is transparent in the wavelength range of the slave laser.

As shown in FIG. 9, since the two pulse beams having much different wavelengths are produced so as to be synchronized with each other, they can easily be mixed with each other to generate sum-frequency light. Where the Ti:sapphire laser and the Cr:forsterite laser are used, the sum-frequency light has a wavelength of about 510 nm, which means that the sum-frequency generation device 90 is a green femtosecond light source.

The second harmonic of the Ti:sapphire laser has a wavelength of blue (425 nm) and the second harmonic of the Cr:forsterite laser has a wavelength of red (637 nm). Therefore, the device 90 can generate femtosecond pulse beams of the three primary colors (red, green, and blue) simultaneously. It is expected that the device 90 will be applied to illumination apparatuses and image drawing apparatuses (e.g., projectors). Also, the device 90 has a high utility value as a stable green femtosecond light source for physical and chemical experiments.

Referring to FIG. 9, beams having six wavelengths in total can be produced by inputting the two beams having the first wavelength (frequency: $\omega 1$) and the second wavelength (frequency: $\omega 2$) to the nonlinear crystal 93 to produce a sum-frequency beam having a third wavelength (frequency: $\omega 3 = \omega 1 + \omega 2$) and a differential frequency beam having a fourth wavelength (frequency: ($\omega 4 = \omega 1 - \omega 2$), and inputting the two beams having the first and second wavelengths to the nonlinear crystal 93 to produce beams having half wavelengths, that is, a fifth wavelength (frequency: $\omega 5 = 2 \cdot \omega 1$) and a sixth wavelength (frequency: $\omega 6 = 2 \cdot \omega 2$). An optical field having an arbitrary waveform can be generated by properly combining part of the thus-produced beams having the above wavelengths.

For example, if the first and second wavelengths are 1,275 nm and 850 nm, respectively, the device 90 of FIG. 9 generates a sum-frequency beam having a wavelength 510 nm. Second harmonics having wavelengths 637 nm and 425 nm of the two beams having the first and second wavelengths, respectively, may also be generated at the same time. This means that the single device 90 generates timing-synchronized femtosecond pulse beams of the three primary colors (red, green, and blue).

It is noted that the device 90 of FIG. 9 also generates a differential frequency beam (not shown) together with the sum-frequency beam.

The present invention has been described in detail with respect to preferred embodiments, and it will now be apparent from the foregoing to those skilled in the art that changes and modifications may be made without departing from the invention in its broader aspect, and it is the intention, therefore, in the apparent claims to cover all such changes and modifications as fall within the true spirit of the invention.

What is claimed is:

1. A timing synchronization device of a pulsed laser, comprising:
    a first laser gain medium having a first gain region;
    a second laser gain medium having a second gain region that is not included in the first gain region; and
    first and second resonators provided with the first and second laser gain media, respectively, and arranged so that two laser pulses occurring in the first and second resonators, respectively, overlap with each other in one of the first and second laser gain media,
    wherein the second laser gain medium has an oscillation wavelength at which a crystal of the first laser gain medium cannot cause oscillation.

2. An optical synthesizer comprising:
    the timing synchronization device according to claim 1;
    a nonlinear crystal; and
    a half-mirror,
    wherein first and second pulse laser beams having different first and second frequencies, respectively, that are output from the timing synchronization device are input to the nonlinear crystal, and wherein the optical synthesizer outputs, through the nonlinear crystal, a sum-frequency beam having a sum frequency of the first and second frequencies and a differential frequency beam having a differential frequency of the first and second frequencies, outputs, through the nonlinear crystal, a second harmonic pulse of first beam having a frequency that is two times higher than the first frequency, and outputs, through the nonlinear crystal, a second harmonic pulse of second beam having a frequency that is two times higher than the second frequency, and outputs the first and second pulse laser beams as they are.

3. The optical synthesizer according to claim 2, wherein the first and second frequencies correspond to wavelengths of 850 nm and 1,275 nm, respectively, and the sum frequency corresponds to a wavelength of 510 nm.

4. The optical synthesizer according to claim 2, wherein the optical synthesizer combines arbitrarily selected ones of the first and second pulse laser beams, the sum-frequency beam, the differential frequency beam, and the first and second second harmonic beams, and outputs a resulting beam.

5. The timing synchronization device according to claim 1, wherein group velocity dispersion of each of the first and second resonators as a whole is set minus, and wherein a leading laser pulse changes a refractive index characteristic of the one laser gain medium to a red-shift-inducing characteristic or a blue-shift-inducing characteristic and a lagging laser pulse is caused to pass through the one laser gain medium, whereby the leading laser pulse and the lagging laser pulse are synchronized with each other.

6. The optical synthesizer comprising:
    the timing synchronization device according to claim 5;
    a nonlinear crystal; and
    a half-mirror,
    wherein first and second pulse laser beams having different first and second frequencies, respectively, that are output from the timing synchronization device are input to the nonlinear crystal, and wherein the optical synthesizer outputs, through the nonlinear crystal, a sum-frequency beam having a sum frequency of the first and second frequencies and a differential frequency beam having a differential frequency of the first and second frequencies, outputs, through the nonlinear crystal, a second harmonic pulse of first beam having a frequency that is two times higher than the first frequency, and outputs, through the nonlinear crystal, a second harmonic pulse of second beam having a frequency that is two times higher than the second frequency, and outputs the first and second pulse laser beams as they are.

7. The optical synthesizer according to claim 6, wherein the first and second frequencies correspond to wavelengths of 850 nm and 1,275 nm, respectively, and the sum frequency corresponds to a wavelength of 510 nm.

8. The optical synthesizer according to claim 6, wherein the optical synthesizer combines arbitrarily selected ones of the first and second pulse laser beams, the sum-frequency beam, the differential frequency beam, and the first and second second harmonic beams, and outputs a resulting beam.

9. The timing synchronization device according to claim 1, wherein a first pulse laser beam produced by using the first laser gain medium and a second pulse laser beam produced by using the second laser gain medium are synchronized with each other in such a manner that an interval between adjacent frequency components of the first pulse laser beam and that of the second pulse laser beam are made identical through four-wave mixing.

10. The timing synchronization device according to claim 1, wherein the first gain medium is Ti:sapphire and the second gain medium is Cr:forsterite.

11. An optical synthesizer comprising:
    the timing synchronization device according to claim 10;
    a nonlinear crystal; and
    a half-mirror,
    wherein first and second pulse laser beams having different first and second frequencies, respectively, that are output from the timing synchronization device are input to the nonlinear crystal, and wherein the optical synthesizer outputs, through the nonlinear crystal, a sum-frequency beam having a sum frequency of the first and second frequencies and a differential frequency beam having a differential frequency of the first and second frequencies, outputs, through the nonlinear crystal, a second harmonic pulse of first beam having a frequency that is two times higher than the first frequency, and outputs, through the nonlinear crystal, a second harmonic pulse of second beam having a frequency that is two times higher than the second frequency, and outputs the first and second pulse laser beams as they are.

12. The optical synthesizer according to claim 11, wherein the first and second frequencies correspond to wavelengths of 850 nm and 1,275 nm, respectively, and the sum frequency corresponds to a wavelength of 510 nm.

13. The optical synthesizer according to claim 11, wherein the optical synthesizer combines arbitrarily selected ones of the first and second pulse laser beams, the sum-frequency beam, the differential frequency beam, and the first and second second harmonic beams, and outputs a resulting beam.

14. The timing synchronization device according to claim 1, wherein the first laser gain medium is Ti:sapphire and the second laser gain medium is $Cr^{4+}$-doped YAG.

15. An optical synthesizer comprising:
the timing synchronization device according to claim 14;
a nonlinear crystal; and
a half-mirror,
wherein first and second pulse laser beams having different first and second frequencies, respectively, that are output from the timing synchronization device are input to the nonlinear crystal, and wherein the optical synthesizer outputs, through the nonlinear crystal, a sum-frequency beam having a sum frequency of the first and second frequencies and a differential frequency beam having a differential frequency of the first and second frequencies, outputs, through the nonlinear crystal, a second harmonic pulse of first beam having a frequency that is two times higher than the first frequency, and outputs, through the nonlinear crystal, a second harmonic pulse of second beam having a frequency that is two times higher than the second frequency, and outputs the first and second pulse laser beams as they are.

16. The optical synthesizer according to claim 15, wherein the first and second frequencies correspond to wavelengths of 850 nm and 1,275 nm, respectively, and the sum frequency corresponds to a wavelength of 510 nm.

17. The optical synthesizer according to claim 15, wherein the optical synthesizer combines arbitrarily selected ones of the first and second pulse laser beams, the sum-frequency beam, the differential frequency beam, and the first and second second harmonic beams, and outputs a resulting beam.

18. An optical synthesizer comprising:
the timing synchronization device according to claim 9; and
a nonlinear crystal; and
a half-mirror,
wherein first and second pulse laser beams having different first and second frequencies, respectively, that are output from the timing synchronization device are input to the nonlinear crystal, and wherein the optical synthesizer outputs, through the nonlinear crystal, a sum-frequency beam having a sum frequency of the first and second frequencies and a differential frequency beam having a differential frequency of the first and second frequencies, outputs, through the nonlinear crystal, a second harmonic pulse of first beam having a frequency that is two times higher than the first frequency, and outputs, through the nonlinear crystal, a second harmonic pulse of second beam having a frequency that is two times higher than the second frequency, and outputs the first and second pulse laser beams as they are.

19. The optical synthesizer according to claim 18, wherein the first and second frequencies correspond to wavelengths of 850 nm and 1,275 nm, respectively, and the sum frequency corresponds to a wavelength of 510 nm.

20. The optical synthesizer according to claim 18, wherein the optical synthesizer combines arbitrarily selected ones of the first and second pulse laser beams, the sum-frequency beam, the differential frequency beam, and the first and second second harmonic beams, and outputs a resulting beam.

* * * * *

UNITED STATES PATENT AND TRADEMARK OFFICE
CERTIFICATE OF CORRECTION

PATENT NO.    : 6,628,684 B2
DATED         : September 30, 2003
INVENTOR(S)   : Kobayashi et al.

It is certified that error appears in the above-identified patent and that said Letters Patent is hereby corrected as shown below:

Column 9,
Line 57, replace "second second harmonic" with -- second harmonic --.

Column 10,
Line 28, replace "second second harmonic" with -- second harmonic --.

Column 12,
Lines 1 and 31, replace "second second harmonic" with -- second harmonic --.

Signed and Sealed this

Twentieth Day of April, 2004

JON W. DUDAS
*Acting Director of the United States Patent and Trademark Office*